United States Patent
Cheng

(10) Patent No.: US 11,301,606 B1
(45) Date of Patent: Apr. 12, 2022

(54) COUNTING METHOD FOR COUNTING THE STAGE NUMBER PASSING THROUGH A SIGNAL PATH ON A GRAPHICAL USER INTERFACE

(71) Applicant: Winbond Electronics Corp., Taichung (TW)

(72) Inventor: Kai-Hsu Cheng, New Taipei (TW)

(73) Assignee: WINDBOND ELECTRONICS CORP., Taichung (TW)

(*) Notice: Subject to any disclaimer, the term of this patent is extended or adjusted under 35 U.S.C. 154(b) by 0 days.

(21) Appl. No.: 17/317,009

(22) Filed: May 11, 2021

(51) Int. Cl.
 *G06F 30/31* (2020.01)

(52) U.S. Cl.
 CPC .................. *G06F 30/31* (2020.01)

(58) Field of Classification Search
 CPC ........................................ G06F 30/31
 USPC ............................................ 716/139
 See application file for complete search history.

(56) References Cited

U.S. PATENT DOCUMENTS

| | | | |
|---|---|---|---|
| 6,240,541 B1 | 5/2001 | Yasuda et al. | |
| 6,308,305 B1 | 10/2001 | Sugiyama et al. | |
| 8,074,198 B2 | 12/2011 | Uchida | |
| 2005/0050499 A1* | 3/2005 | Matsumoto | G06F 30/3312 716/113 |
| 2005/0276135 A1* | 12/2005 | Yonezawa | G06F 30/3312 365/203 |
| 2006/0112158 A1 | 5/2006 | Tetelbaum | |
| 2007/0074138 A1 | 3/2007 | Homma et al. | |
| 2019/0205487 A1 | 7/2019 | Tamiya | |

FOREIGN PATENT DOCUMENTS

JP        4736822 B2    7/2011

* cited by examiner

*Primary Examiner* — Eric D Lee
(74) *Attorney, Agent, or Firm* — Birch, Stewart, Kolasch & Birch, LLP

(57) ABSTRACT

A counting method adapted to count the stage number of an integrated circuit is provided herein. The counting method includes selecting an initial segment on a graphical user interface; determining whether the initial segment is floating; when it is determined that the initial segment is coupled to a first device, storing the first device in a device register; increasing the stage number by 1 to be a first stage number corresponding to the first device; storing all segments coupled to the first device except the initial segment in a first coupling register; selecting a first segment from the first coupling register; determining whether the first segment is floating; and when it is determined that the first segment is not floating, displaying the first stage number at the first segment on the graphical user interface.

18 Claims, 4 Drawing Sheets

COUNTING METHOD FOR COUNTING THE STAGE NUMBER PASSING THROUGH A SIGNAL PATH ON A GRAPHICAL USER INTERFACE

BACKGROUND OF THE INVENTION

Field of the Invention

The disclosure relates generally to counting methods and counting devices, and more particularly it relates to counting methods and counting devices for counting the stage number passing through a signal path on a graphical user interface.

Description of the Related Art

Since each unit in the circuit causes signal delay, it is often necessary to calculate the number of devices passing through the signal path in order to find the path with the longest delay time in the process of designing a circuit. In addition, due to the increasing complexity of circuit design, it takes a lot of time for designers and reviewers to find the path having the longest delay time. Therefore, it is necessary to optimize the method for finding the path having the longest delay time.

BRIEF SUMMARY OF THE INVENTION

Counting methods and counting devices provided herein can count the stage number passing through a signal path, so that the designer can find the path having the longest delay time according to the counting result, thereby reducing the time it takes for the designer and reviewer to examine the integrated circuit, and greatly improving design efficiency.

In an embodiment, a counting method adapted to count a stage number of an integrated circuit is provided. The counting method comprises selecting an initial segment of the integrated circuit on a graphical user interface; determining whether the initial segment is in a floating state; when it is determined that the initial segment is coupled to a first device, storing the first device in a first device register; increasing the stage number by 1 to be the first stage number that corresponds to the first device; storing all segments coupled to the first device except for the initial segment in a first coupling register; selecting a first segment from the first coupling register; determining whether the first segment is in the floating state; and when it is determined that the first segment is not in the floating state, displaying the first stage number at the first segment on the graphical user interface.

In an embodiment, a counting device adapted to count a stage number of an integrated circuit is provided. The counting device comprises a machine-readable storage medium and a processor. The machine-readable storage medium is configured to store machine executable codes. The processor executes the machine executable codes to perform a plurality of steps, wherein the steps comprise selecting an initial segment of the integrated circuit on a graphical user interface; determining whether the initial segment is in a floating state; when it is determined that the initial segment is coupled to a first device, storing the first device in a first device register; increasing the stage number by 1 to be the first stage number that corresponds to the first device; storing all segments coupled to the first device except for the initial segment in a first coupling register; selecting a first segment from the first coupling register; determining whether the first segment is in the floating state; and when it is determined that the first segment is not in the floating state, displaying the first stage number at the first segment on the graphical user interface.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
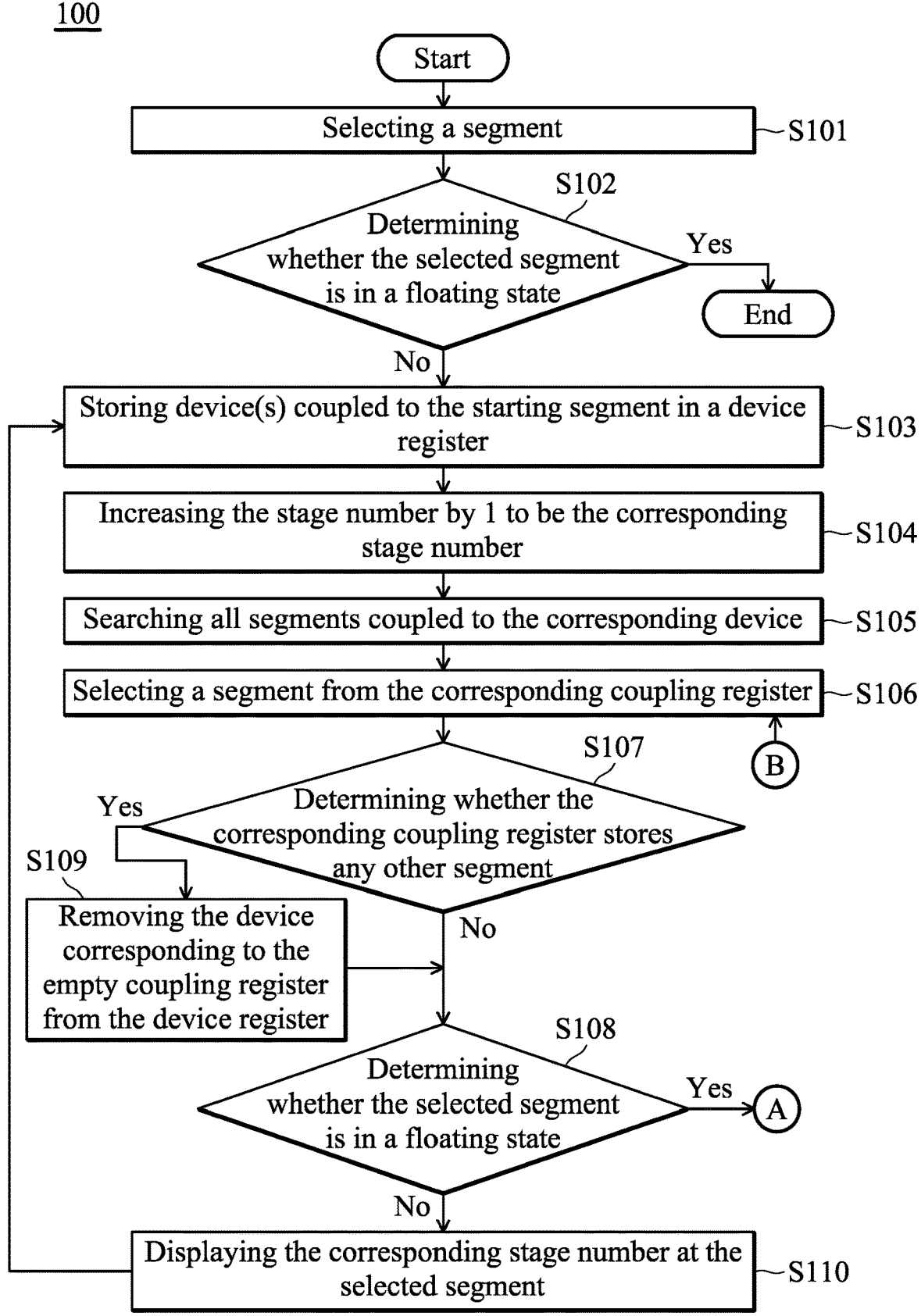
FIGS. 1A-1B illustrates a flow chart of a counting method in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 1B:
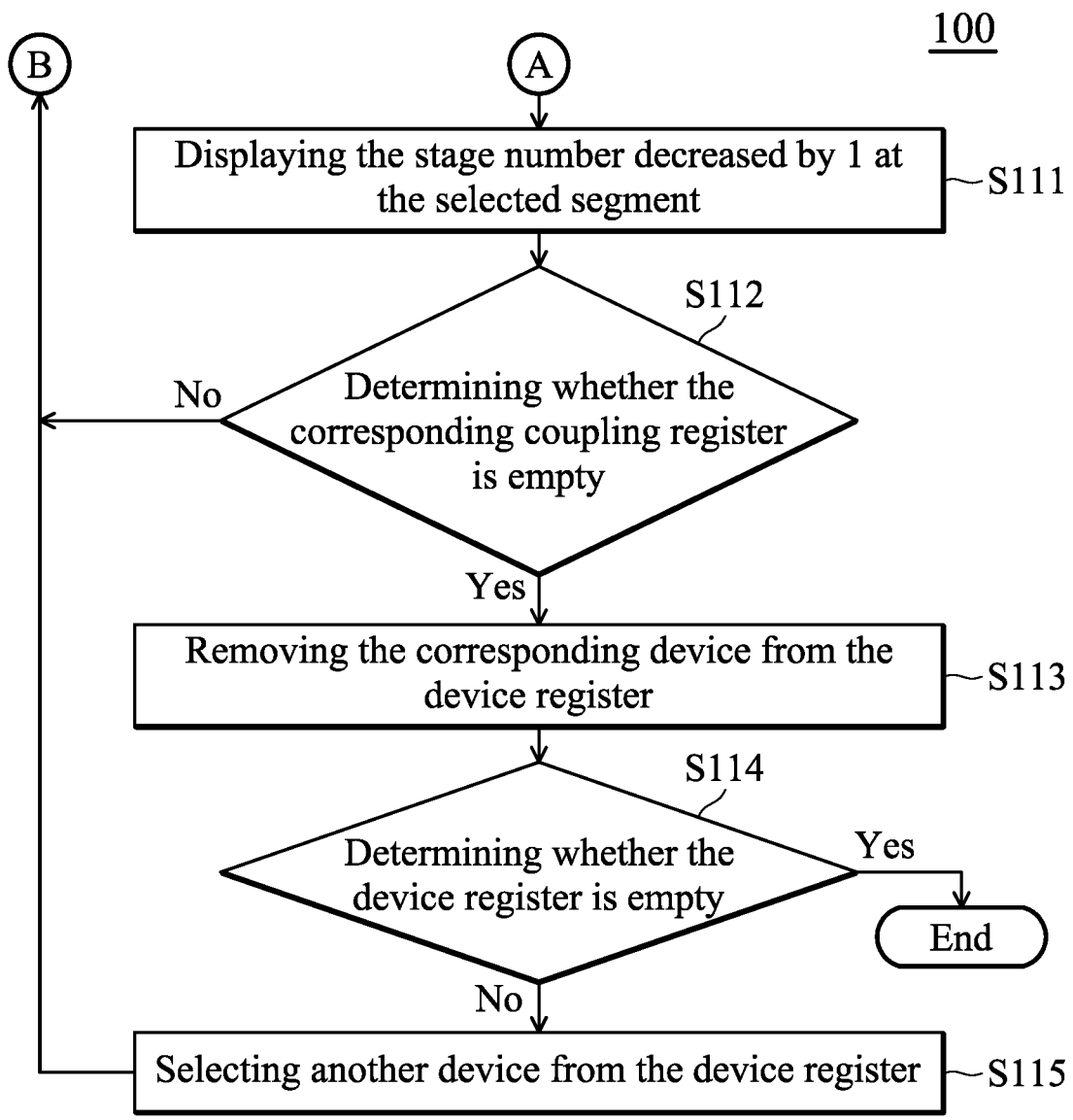

FIGS. 1A-1B illustrates a flow chart of a counting method in accordance with an embodiment of the invention. As shown in FIG. 1A, a segment is selected on the graphical user interface (Step S101) to be an initial segment. Then, it is determined whether the selected segment is in a floating state (Step S102).

Figure 2:
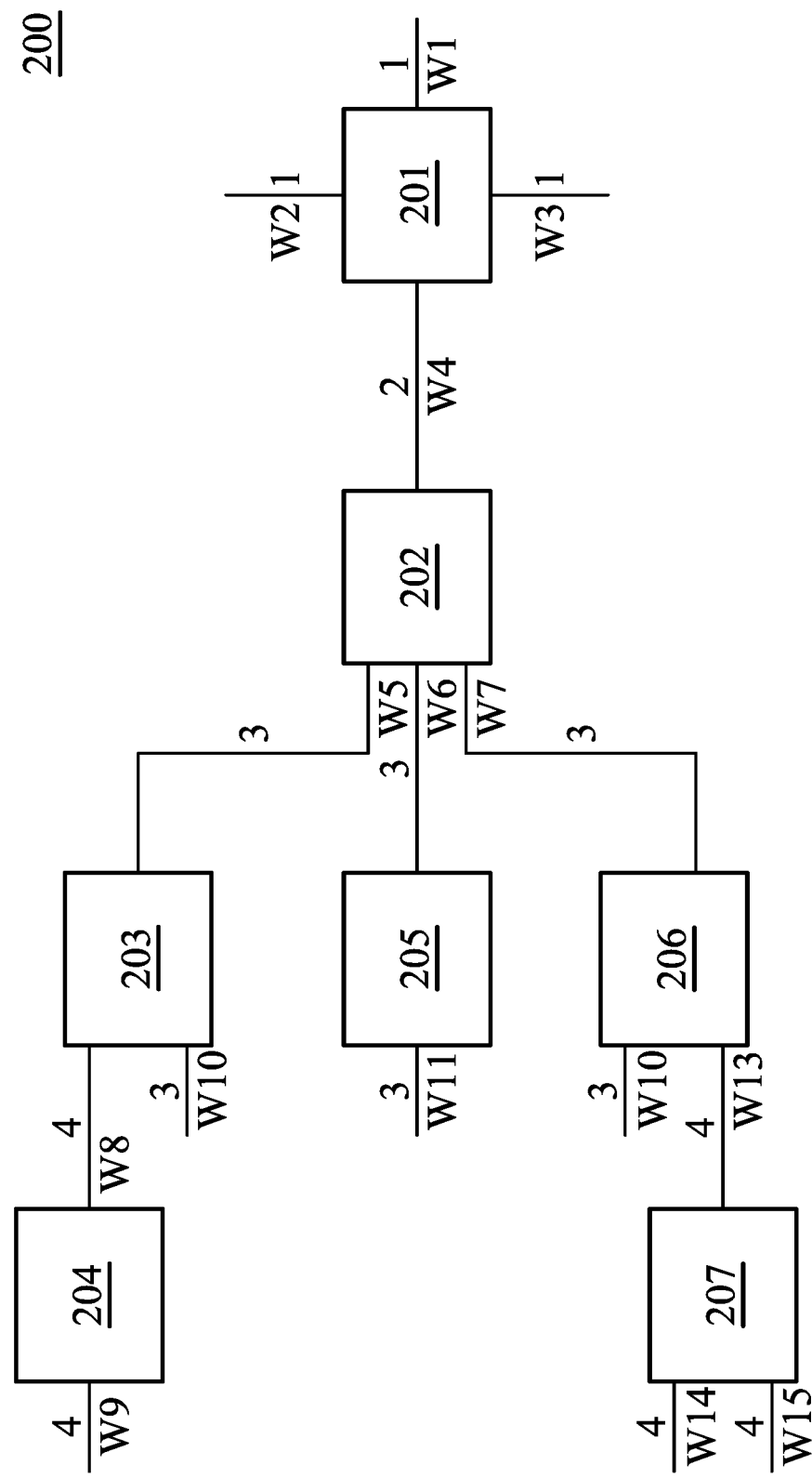
FIG. 2 is a schematic diagram of an integrated circuit in accordance with an embodiment of the invention.

FIG. 2 is a schematic diagram of an integrated circuit in accordance with an embodiment of the invention. According to an embodiment of the invention, the integrated circuit shown in FIG. 2 is shown on the graphical user interface. As shown in FIG. 2, the integrated circuit 200 includes a first device 201, a second device 202, a third device 203, a fourth device 204, a fifth device 205, a sixth device 206 and a seventh device 207, in which those devices 201-207 are coupled as shown in FIG. 2.

According to some embodiments of the invention, any one of the devices 201-207 could be an electronic element, such as a logic gate and a transistor, and may a hierarchical circuit element including a plurality of electronic elements coupled in series. For the simplicity of explanation, each of the devices 201-207 is a single electronic element, such as a transistor or a logic gate, instead of a hierarchical circuit element. However, the invention can be utilized for hierarchical circuit elements as well.

For example, when the counting method 100 is executed, an initial segment is first selected on the graphical user interface (Step S101), and it is determined whether the starting segment is in a floating state (Step S102). When it is determined that the starting segment is not in a floating state, Step S103 is executed. When it is determined that the starting segment is in a floating state, the counting method 100 is completed.

For example, as shown in FIG. 2, the segment W1 is selected to be the starting segment in Step S101, and it is determined whether the segment W1 is in a floating state in Step S102. As shown in FIG. 2, since the segment W1 is coupled to the first device 201, it is determined that the segment W1 is not in a floating state and Step S103 is executed.

As shown in FIG. 2, the counting method 100 is illustrated to count the stage number from the output terminal to the input terminal, but not intended to be limited thereto. In addition, the counting method 100 in FIG. 1A may be adapted to count the stage number from the input terminal to the output terminal, and may also be adapted to count the stage number from any segments in the circuit toward the input terminal and the output terminal.

Referring to FIG. 1A, in Step S103, a device coupled to the starting segment is stored in a device register. In Step S104, the stage number is increased by 1 to be the corresponding stage number.

For example, as shown in FIG. 2, since the segment W1 is coupled to the first device 201, it is determined that the segment W1 is not in a floating state. Therefore, the first device 201 is stored I the device register (Step S103), and the stage number of the integrated circuit 200 is increased by 1 to be stored as the first stage number corresponding to the first device 201 coupled to the segment W1 (Step S104). According to an embodiment of the invention, when the segment W1 is selected in Step S101, the starting stage number is 1. After the stage number of the integrated circuit 200 is increased by 1 in Step S104, the first stage number corresponding to the first device 201 is the sum of the starting stage number and 1, which is 2. According to an embodiment of the invention, the stage number is displayed in the middle of the segment. In other words, the starting stage number (i.e., 1) is displayed in the middle of the segment W1.

Referring to FIG. 1A, in Step S105, all segments coupled to the corresponding device are searched, and the segments that have not been retrieved are stored in the corresponding coupling register. For example, as shown in FIG. 2, the first device 201 is coupled to the segment W1, the second segment W2, the third segment W3, and the fourth segment W4, and only the segment W1 has been retrieved. Therefore, in Step S105, the second segment W2, the third segment W3, and the fourth segment W4 are stored in a first coupling register corresponding to the first device 201.

Referring to FIG. 1A, in Step S106, a segment is selected from the corresponding coupling register and the selected segment is removed from the corresponding coupling register. For example, as shown in FIG. 2, one of the second segment W2, the third segment W3, and the fourth segment W4 is selected from the first coupling register, and the selected segment is also removed from the first coupling register. According to an embodiment of the invention, the top segment on the graphical user interface is selected in Step S106 (i.e., the second segment W2) so that only the third segment W3 and the fourth segment W4 are left in the first coupling register. According to other embodiments of the invention, the user may define the logic of selecting the segment.

Referring to FIG. 1A, in Step S107, it is determined whether the corresponding coupling register stores any other segment. When it is determined in Step S107 that the corresponding coupling register stores other segment, Step S108 is executed. In Step S108, it is determined whether the segment selected in Step S106 is in a floating state. When it is determined in Step S107 that the corresponding coupling register does not store any other segment, Step S109 is executed. In Step S109, the device corresponding to the empty coupling register is removed from the device register.

For example, as shown in FIG. 2, when the fourth segment W4 is selected in Step S106 and the first coupling register still has the second segment W2 and the third segment W3, Step S108 is executed to determine whether the selected fourth segment W4 is in a floating state after it is determined in Step S107 that the first coupling register still has other segments. For example, as shown in FIG. 2, when the third segment W3 is selected in Step S106 and the first coupling register is empty, the first device 201 is removed from the device register and it is then determined whether the selected third segment W3 is in a floating state.

Referring to FIG. 1A, when it is determined in Step S108 that the selected segment is not in a floating state, Step S110 is executed. In Step S110, the corresponding stage number is displayed at the selected segment. After Step S110, Step S103 is repeated to store the coupled device in the device register, and Step S104 to Step S108 are executed in sequence.

For example, as shown in FIG. 2, when the fourth segment W4 is selected in Step S106, the stage number corresponding to the first device 201 (i.e., 2) is displayed at the fourth segment W4 (Step S110). Since the fourth segment W4 is coupled to the first device 201 and the second device 202 and the first device 201 is already stored in the device register, the second device 202 is stored in the device register (Step S103) and the first stage number corresponding to the first device 201 is increased by 1 (i.e., 3) to be the second stage number corresponding to the second device 202 (Step S104). In addition, other segments coupled to the second device 202 (i.e., the fifth segment W5, the sixth segment W6, and the seventh segment W7) are stored in the second coupling register (Step S105).

According to an embodiment of the invention, when the fifth segment W5 is selected from the second coupling register in Step S106, it is determined that the second coupling register still has the sixth segment W6 and the seventh segment W7 (Step S107), and Step S108 is then executed. After it is determined in Step S108 that the fifth segment W5 is not in a floating state, the second stage number corresponding to the second device 202 (i.e., 3) is displayed at the fifth segment W5 (Step S110), and Step S103 is repeated to store the third device 203 coupled to the fifth segment W5 in the device register. According to an embodiment of the invention, the second number of cell level (i.e., 3) is displayed in the middle of the fifth segment W5.

According to another embodiment of the invention, when only the seventh segment W7 is left in the second coupling register and the seventh segment W7 is selected from the second coupling register in Step S106, it is determined in Step S107 that the second coupling register is empty and the second device 202 is removed from the device register (Step S109). Then, it is determined that the seventh segment W7 is not in a floating state (Step S108), and the second stage number (i.e., 3) corresponding to the second device 202 is displayed in the seventh segment W7 (Step S110). Step S103 is then repeated to store the seventh device 207 coupled to the seventh segment W7 in the device register. According to an embodiment of the invention, the second stage number (i.e., 3) is displayed in the middle of the seventh segment W7.

Referring to FIG. 1A, when it is determined in Step S108 that the selected segment is not in a floating state, Step S111 and Step S112 in FIG. 1B are executed in sequence. In Step S111, the stage number is decreased by 1, and the stage number decreased by 1 is displayed at the selected segment. In Step S112, it is determined whether the corresponding coupling register still has any other segment. When it is determined in Step S112 that the corresponding coupling segment still has other segments, Step S106 is repeated to select another segment from the corresponding coupling register and remove the selected segment from the corresponding coupling register. Step S107 and Step S108 are then executed in sequence.

For example, as shown in FIG. 2, when it is determined in Step S108 that the second segment W2 and the third segment W3 are in a floating state, the first stage number corresponding to the first device 201 (i.e., 2) is decreased by 1 (i.e., 1), and the first stage number decreased by 1 is displayed at the second segment W2 and the third segment W3. When it is determined in Step S108 that the ninth segment W9 is in a floating state, the fourth stage number corresponding to the fourth device 204 (i.e., 5) is decreased by 1 (i.e., 4), and the fourth stage number decreased by 1 is displayed at the ninth segment W9. When it is determined in Step S108 that the eleventh segment W11 is in a floating state, the fifth stage number corresponding to the fifth device 205 (i.e., 4) is decreased by 1 (i.e., 3), and the fifth stage number decreased by 1 is displayed at the eleventh segment W11. When it is determined in Step S108 that the twelfth segment W12 is in a floating state, the sixth stage number corresponding to the sixth device 206 (i.e., 4) is decreased by 1 (i.e., 3), and the sixth stage number decreased by 1 is displayed at the twelfth segment W12. When it is determined in Step S108 that the fourteenth segment W14 and the fifteenth segment W15 are in a floating state, the seventh stage number corresponding to the seventh device 207 (i.e., 5) is decreased by 1 (i.e., 4), and the seventh stage number decreased by 1 is displayed at the fourteenth segment W14 and the fifteenth segment W15.

Referring to FIG. 1B, when it is determined in Step S112 that the corresponding coupling register does not have any other segment, Step S113 is executed. In Step S113, since the corresponding coupling register is empty, the corresponding device is removed from the device register and Step S114 is then executed. In Step S114, it is determined whether the device register still has any other devices. When it is determined in Step S114 that the device register still has other devices, Step S115 is executed.

In Step S115, another device is selected from the device register, and the selected device is also removed from the device register. After Step S115, Step S106 to Step S108 are repeated. When it is determined in Step S114 that the device register does not have any other devices, this indicates that all elements in the integrated circuit 200 have been counted completely so that the counting method 100 is completed.

According to an embodiment of the invention, when another device is selected from the device register in Step S115, the device that is first stored in the device register is first selected. According to another embodiment of the invention, when another device is selected from the device register in Step S115, the device that is the last one stored in the device register is first selected. According to other embodiments of the invention, when another device is selected from the device register in Step S115, the device is randomly selected from the device register.

For example, as shown in FIG. 2, when the fourth stage number corresponding to the fourth device 204 is decreased by 1 and the fourth stage number decreased by 1 is displayed at the ninth segment W9 in Step S111, it is determined in Step S112 that the fourth coupling register corresponding to the fourth device 204 does not have any other segment, and the device register has the first device 201, the second device 202, the third device 203, and the fourth device 204 at the same time, the device register still has the first device 201, the second device 202, and the third device 203 after the fourth device 204 is removed from the device register in Step S113.

When it is determined in Step S114 that the device register still has other devices, one device is selected from the device register in Step S115. According to an embodiment of the invention, when one device is selected from the device register in Step S115, the device that is first stored in the device register is selected. According to another embodiment of the invention, when one device is selected from the device register in Step S115, the device that is the last one stored in the device register is selected. According to other embodiments of the invention, when one device is selected from the device register in Step S115, the device is randomly selected from the device register.

In other words, since the first device 201, the second device 202, and the third device 203 are sequentially stored in the device register, the first device 201 that is first stored in the device register may be selected in Step S115, and the third device 203 that is the last one store in the device may be selected as well.

For example, the counting method 100 sequentially counts the first device 201, the second device 202, the third device 203, and the fourth device 204. According to an embodiment of the invention, after the counting method 100 displays the stage number (i.e., 4) corresponding to the fourth device 204 at the ninth segment W9 in Step S111, the counting method 100 selects the first device 201 from the device register in Step S115. After the first stage number decreased by 1 (i.e., 1) is displayed at the second segment W2 and the third segment W3, the counting method 100 then selects the second device 202 in Step S115 and sequentially counts the fifth device 205, the sixth device 206, and the seventh device 207.

According to another embodiment of the invention, after the counting method 100 displays the stage number corresponding to the fourth device 204 (i.e., 4) at the ninth segment W9 in Step S111, the counting method 100 selects the third device 203 from the device register in Step S115. After the third stage number (i.e., 3) is displayed at the tenth segment W10, the counting method 100 selects the second device 202 in Step S115 and then sequentially counts the fifth device 205, the sixth device 206, and the seventh device 207.

According to an embodiment of the invention, when the counting method 100 is completed, a netlist may be generated to display the stage number of each of the devices 201-207 and the names of the coupled segments.

Figure 3:
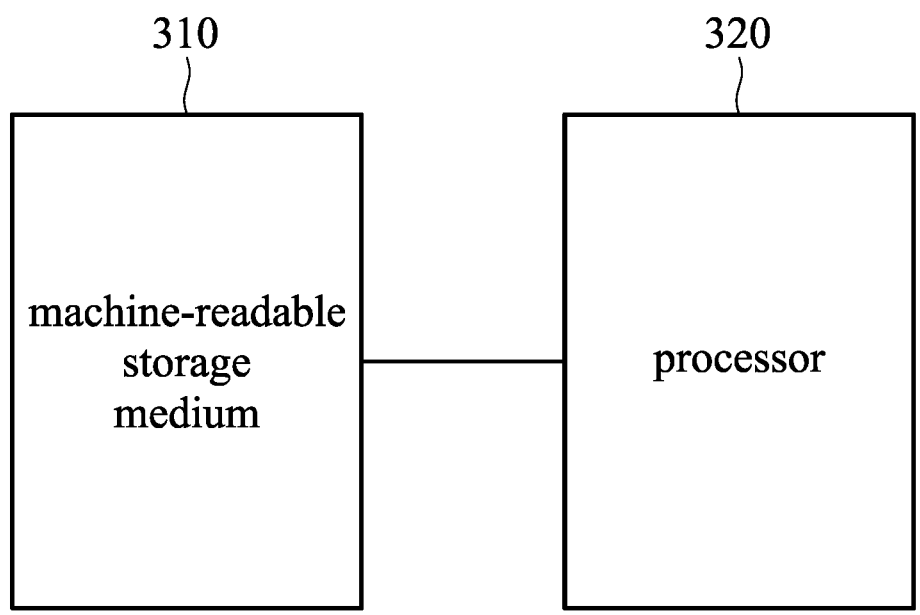
FIG. 3 is a block diagram of a counting device in accordance with an embodiment of the invention.

FIG. 3 is a block diagram of a counting device in accordance with an embodiment of the invention. As shown in FIG. 3, the counting device 300 includes a machine-readable storage medium 310 and a processor 320. The machine-readable storage medium 310 is configured to store machine executable codes. When the processor 320 executes the machine executable codes, the counting method 100 in FIGS. 1A-1B is executed.

Counting methods and counting devices provided herein can count the stage number passing through a signal path, so that the designer can find the path having the longest delay time according to the counting result, thereby reducing the time it takes for the designer and reviewer to examine the integrated circuit, and greatly improving design efficiency.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A counting method adapted to count a stage number of an integrated circuit, comprising:
   selecting an initial segment of the integrated circuit on a graphical user interface;
   determining whether the initial segment is in a floating state;
   when it is determined that the initial segment is coupled to a first device, storing the first device in a device register;
   increasing the stage number by 1 to be a first stage number corresponding to the first device;
   storing all segments coupled to the first device except for the initial segment in a first coupling register;
   selecting a first segment from the first coupling register;
   determining whether the first segment is in the floating state; and
   when it is determined that the first segment is not in the floating state, displaying the first stage number at the first segment on the graphical user interface.

2. The counting method as defined in claim 1, further comprising:
   when it is determined that the first segment is in the floating state, displaying the first stage number decreased by 1 at the first segment on the graphical user interface.

3. The counting method as defined in claim 1, further comprising:
   after the step of displaying the first stage number decreased by 1 at the first segment on the graphical user interface, determining that the first segment is coupled to a second device;
   storing the second device in the device register;
   increasing the stage number by 1 to be a second stage number that corresponds to the second device;
   storing all segments coupled to the second device except for the first segment in a second coupling register;
   selecting a second segment from the second coupling register and removing the second segment from the second coupling register;
   determining whether the second segment is in the floating state;
   when it is determined that the second segment is not in the floating state, displaying the second stage number at the second segment on the graphical user interface; and
   when it is determined that the second segment is in the floating state, displaying the second stage number decreased by 1 at the second segment on the graphical user interface.

4. The counting method as defined in claim 3, further comprising:
   after the step of displaying the second stage number decreased by 1 at the second segment on the graphical user interface, determining whether the second coupling register still has any other segments coupled to the second device;
   when it is determined that the second coupling register still has other segments coupled to the second device, selecting a third segment from the second coupling register and removing the third segment from the second coupling register;
   determining whether the third segment is in the floating state;
   when it is determined that the third segment is not in the floating state and that the third segment is coupled to a third device, displaying the second stage number at the third segment on the graphical user interface;
   storing the third device in the device register;
   increasing the second stage number by 1 to be a third stage number corresponding to the third device;
   storing all segments coupled to the third device except for the third segment in a third coupling register; and
   when it is determined that the third segment is in the floating state, displaying the second stage number decreased by 1 at the third segment on the graphical user interface.

5. The counting method as defined in claim 4, further comprising:
   after the step of selecting the third segment from the second coupling register and removing the third segment from the second coupling register, determining whether the second coupling register has any other segment coupled to the second device;
   when it is determined that the second coupling register does not have any segment coupled to the second device, removing the second device from the device register;
   determining whether the device register has any other device; and when it is determined that the device register has any other device, selecting another device from the device register and removing the selected device from the device register.

6. The counting method as defined in claim 5, wherein in the step of selecting another device from the device register and removing the selected device from the device register, a device that is the first one stored in the device register is selected.

7. The counting method as defined in claim 5, wherein in the step of selecting another device from the device register and removing the selected device from the device register, a device that is the last one stored in the device register is selected.

8. The counting method as defined in claim 5, further comprising:
when it is determined that the device register does not have any other device, completing the counting method.

9. The counting method as defined in claim 1, further comprising:
when it is determined that the initial segment is in the floating state, completing the counting method.

10. A counting device adapted to counting a stage number of an integrated circuit, comprising:
a machine-readable storage medium, configured to store machine executable codes; and
a processor, executing the machine executable codes to perform a plurality of steps, wherein the steps comprise:
selecting an initial segment of the integrated circuit on a graphical user interface;
determining whether the initial segment is in a floating state;
when it is determined that the initial segment is coupled to a first device, storing the first device in a device register;
increasing the stage number by 1 to be a first stage number corresponding to the first device;
storing all segments coupled to the first device except for the initial segment in a first coupling register;
selecting a first segment from the first coupling register;
determining whether the first segment is in the floating state; and
when it is determined that the first segment is not in the floating state, displaying the first stage number at the first segment on the graphical user interface.

11. The counting device as defined in claim 10, wherein the steps further comprise:
when it is determined that the first segment is in a floating state, displaying the first stage number decreased by 1 at the first segment on the graphical user interface.

12. The counting device as defined in claim 11, wherein the steps further comprise:
after the step of displaying the first stage number decreased by 1 at the first segment on the graphical user interface, determining the first segment is coupled to a second device;
storing the second device in the device register;
increasing the stage number by 1 to be a second stage number corresponding to the second device;
storing all segments coupled to the second device except for the first segment in a second coupling register;
selecting a second segment from the second coupling register and removing the second segment from the second coupling register;
determining whether the second segment is in the floating state;
when it is determined that the second segment is not in the floating state, displaying the second stage number at the second segment on the graphical user interface; and
when it is determined that the second segment is in the floating state, displaying the second stage number decreased by 1 at the second segment on the graphical user interface.

13. The counting device as defined in claim 12, wherein the steps further comprise:
after the step of displaying the second stage number decreased by 1 at the second segment on the graphical user interface, determining whether the second coupling register still has any other segments coupled to the second device;
when it is determined that the second coupling register still has other segments coupled to the second device, selecting a third segment from the second coupling register and removing the third segment from the second coupling register;
determining whether the third segment is in the floating state;
when it is determined that the third segment is not in the floating state and that the third segment is coupled to a third device, displaying the second stage number at the third segment on the graphical user interface;
storing the third device in the device register;
increasing the second stage number by 1 to be a third stage number corresponding to the third device;
storing all segments coupled to the third device except for the third segment in a third coupling register; and
when it is determined that the third segment is in the floating state, displaying the second stage number decreased by 1 at the third segment on the graphical user interface.

14. The counting device as defined in claim 13, wherein the steps further comprise:
after the step of selecting the third segment from the second coupling register and removing the third segment from the second coupling register, determining whether the second coupling register has any other segments coupled to the second device;
when it is determined that the second coupling register does not have any segments coupled to the second device, removing the second device from the device register;
determining whether the device register has any other devices; and
when it is determined that the device register has other devices, selecting another device from the device register and removing the selected device from the device register.

15. The counting device as defined in claim 14, wherein in the step of selecting another device from the device register and removing the selected device from the device register, the device that is the first one stored in the device register is selected.

16. The counting device as defined in claim 14, wherein in the step of selecting another device from the device register and removing the selected device from the device register, the device that is the last one stored in the device register is selected.

17. The counting device as defined in claim 14, wherein the steps further comprise:
when it is determined that the device register does not have any other devices, ending the counting method.

18. The counting device as defined in claim 10, wherein the steps further comprise:
    when it is determined that the initial segment is in a floating state, completing the counting method.

* * * * *